United States Patent
Nakasha

(10) Patent No.: US 8,891,599 B2
(45) Date of Patent: Nov. 18, 2014

(54) IMAGING APPARATUS, AND TRANSMISSION AND RECEPTION APPARATUS

(75) Inventor: Yasuhiro Nakasha, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 13/163,902

(22) Filed: Jun. 20, 2011

(65) Prior Publication Data

US 2012/0027057 A1 Feb. 2, 2012

(30) Foreign Application Priority Data

Jul. 28, 2010 (JP) .................. 2010-169726

(51) Int. Cl.
| H04B 1/38 | (2006.01) |
| G01S 13/24 | (2006.01) |
| G01S 7/282 | (2006.01) |
| G01S 13/89 | (2006.01) |

(52) U.S. Cl.
CPC ............... *G01S 13/24* (2013.01); *G01S 7/282* (2013.01); *G01S 13/89* (2013.01)
USPC ........................................ 375/221

(58) Field of Classification Search
USPC ............... 375/221; 342/102, 103, 124
See application file for complete search history.

(56) References Cited

U.S. PATENT DOCUMENTS

| 5,499,029 | A | * | 3/1996 | Bashforth et al. ............. 342/22 |
| 6,486,826 | B1 | * | 11/2002 | Cramer et al. ............... 342/124 |
| 6,700,538 | B1 | * | 3/2004 | Richards ...................... 342/458 |
| 7,142,153 | B2 | | 11/2006 | Dwelly et al. |
| 2005/0270219 | A1 | * | 12/2005 | Dwelly et al. ................. 342/22 |
| 2008/0212653 | A1 | | 9/2008 | Kurashima et al. |
| 2009/0154527 | A1 | | 6/2009 | Yoichi |
| 2011/0260906 | A1 | | 10/2011 | Utagawa et al. |

FOREIGN PATENT DOCUMENTS

| JP | 2007-147406 A | 6/2007 |
| JP | 2008-501978 A | 1/2008 |
| JP | 2008-219284 A | 9/2008 |
| JP | 2009-147568 A | 7/2009 |
| JP | 2009-222457 A | 10/2009 |
| JP | 2010-91379 A | 4/2010 |

OTHER PUBLICATIONS

Office Action of Japanese Patent Application No. 2010-169726 dated Feb. 12, 2014 with Partial Translation.

* cited by examiner

*Primary Examiner* — Jaison Joseph

(74) *Attorney, Agent, or Firm* — Fujitsu Patent Center

(57) ABSTRACT

A transmission and reception apparatus includes: a transmitter circuit to transmit to an object a transmission signal including a comb-shaped wave in which a first plurality of pulses are arranged in a comb shape; and a receiver circuit to receive a reflection signal based on the transmission signal.

20 Claims, 4 Drawing Sheets

IMAGING APPARATUS, AND TRANSMISSION AND RECEPTION APPARATUS

CROSS-REFERENCE TO RELATED APPLICATIONS

This application claims the benefit of priority from Japanese Patent Application No. 2010-169726 filed on Jul. 28, 2010, the entire contents of which are incorporated herein by reference.

BACKGROUND

1. Field

Embodiments relate to imaging apparatuses, and transmission and reception apparatuses.

2. Description of Related Art

Imaging apparatuses transmit a signal, such as electromagnetic waves, to an object and obtain information about, for example, a shape or a position of the object, by receiving a reflected signal. The frequency of the signal may be measured by temporally changing a frequency of the transmission signal.

A related art is disclosed in Japanese Unexamined Patent Application Publication No. 2008-501978, for example.

SUMMARY

According to one aspect of the embodiments, a transmission and reception apparatus includes: a transmitter circuit to transmit to an object a transmission signal including a comb-shaped wave in which a first plurality of pulses are arranged in a comb shape; and a receiver circuit to receive a reflection signal based on the transmission signal.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
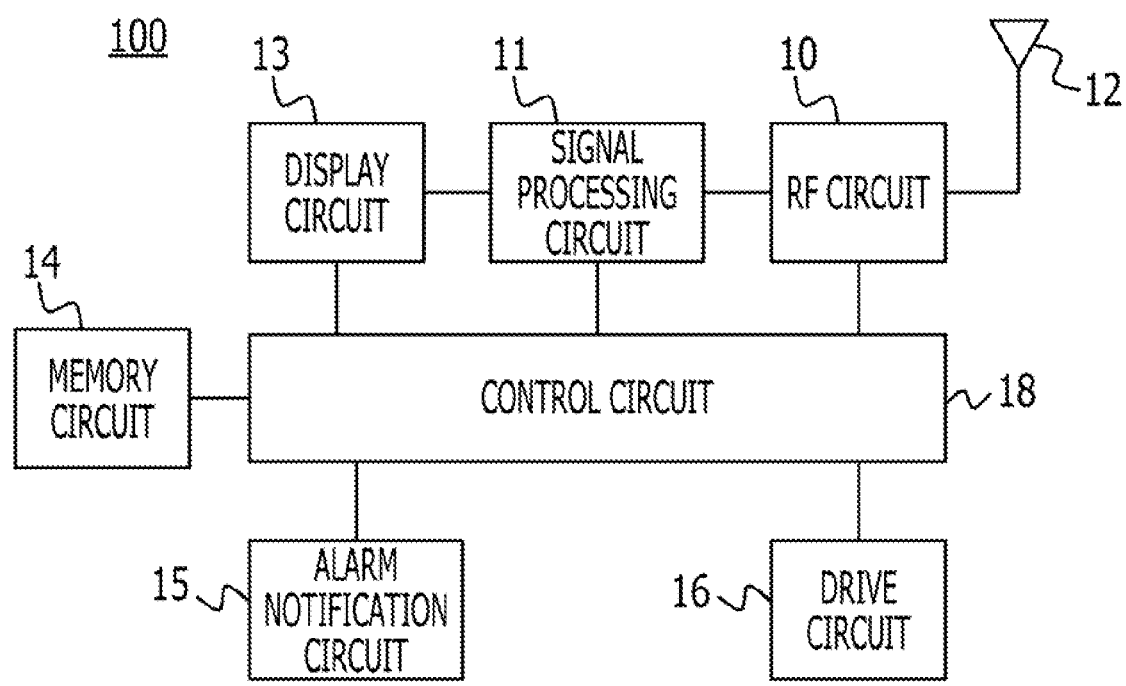
FIG. 1 illustrates an example imaging apparatus.

FIG. 1 illustrates an example imaging apparatus. An imaging apparatus 100 includes a Radio Frequency (RF) circuit 10, a signal processing circuit 11, an antenna 12, a display circuit 13, a memory circuit 14, an alarm notification circuit 15, a drive circuit 16, and a control circuit 18. The imaging apparatus 100 irradiates a measurement object with electromagnetic waves, such as microwaves, millimeter waves, terahertz waves, and submillimeter waves, and obtains the image of the object based on the reflected waves.

The RF circuit 10 transmits a transmission signal to an object through the antenna 12, and receives a reflection signal of the transmission signal from the object. The signal processing circuit 11 processes the reflection signal received by the RF circuit 10, generates image information and performs a signal process. The display circuit 13, which includes, for example, a liquid crystal monitor, displays the image information generated by the signal processing circuit 11.

The memory circuit 14, which includes, for example, a flash memory, stores image information, for example. The alarm notification circuit 15 issues an external alarm using sound, light, or the like. The drive circuit 16, which includes a drive mechanism, changes the orientation of the antenna 12 for the object, for example. The RF circuit 10, the signal processing circuit 11, the display circuit 13, the memory circuit 14, the alarm notification circuit 15, and the drive circuit 16 are controlled by the control circuit 18.

Figure 2:
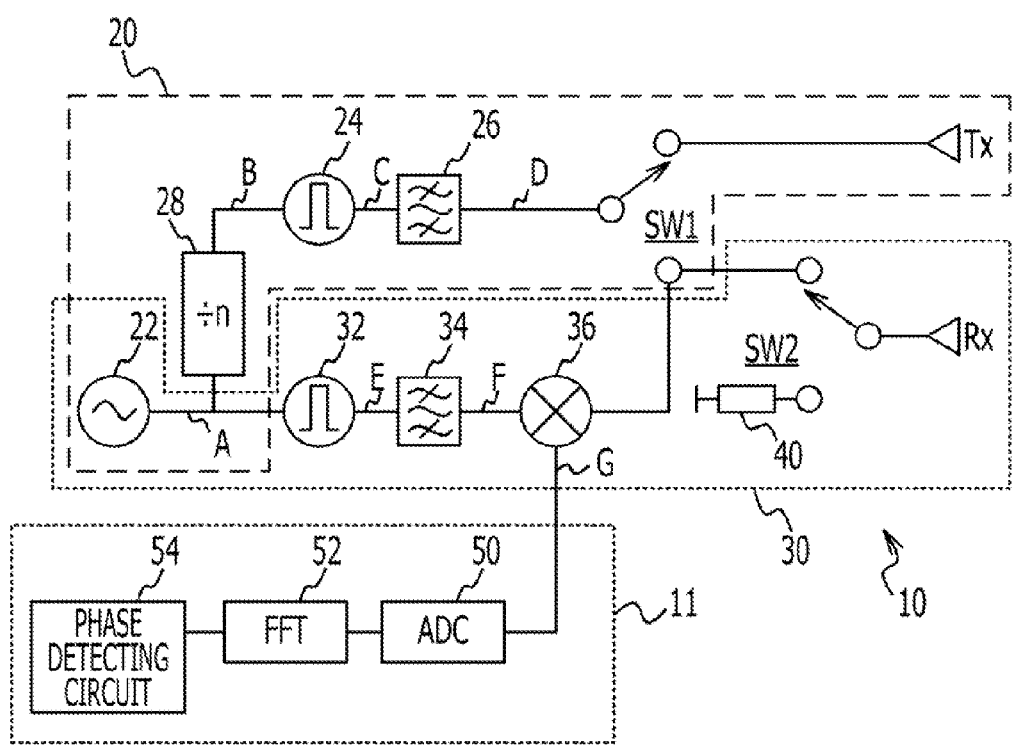
FIG. 2 illustrates an example transmission and reception apparatus.

FIG. 2 illustrates an example RF circuit and an example signal processing circuit. The RF circuit 10 and the signal processing circuit 11 illustrated in FIG. 2 may be the RF circuit and signal processing circuit illustrated in FIG. 1. The RF circuit 10 includes a transmitter circuit 20 and a receiver circuit 30. The transmitter circuit 20 includes an oscillator 22, a first short pulse generator 24, a first band pass filter 26, and a frequency divider 28. A transmitter terminal TX of the transmitter circuit 20 may be coupled to the antenna 12. The receiver circuit 30 includes the oscillator 22, a second short pulse generator 32, a second band pass filter 34, and a mixer 36. A receiver terminal Rx of the receiver circuit 30 may be coupled to the antenna 12. The transmitter circuit 20 and the receiver circuit 30 share the oscillator 22, whereby the size of the apparatus is reduced.

FIGS. 3A to 3G illustrate example signal waveforms of a transmission and reception apparatus. Each horizontal axis shows frequency and each vertical axis shows the level of an output. The signal waveforms illustrated in FIGS. 3A to 3G may be the signal waveforms at respective points A to G illustrated in FIG. 2. Referring to FIG. 3A, in the transmitter circuit 20, the oscillator 22 generates a short pulse oscillator signal. Referring to FIG. 3B, the oscillator signal is input to the frequency divider 28 with a frequency dividing ratio n, and converted into a frequency-divided signal having a low frequency. The frequency of the frequency-divided signal may correspond to a step frequency $\Delta f$ of the imaging apparatus 100.

The output signal of the frequency divider 28 is input to the first short pulse generator 24. Referring to FIG. 3C, the first short pulse generator 24 generates a plurality of pulses for transmission in which a plurality of frequency components are arranged at fixed intervals, for example, at intervals of the step frequency $\Delta f$. Referring to FIG. 3D, the pulse signals are input to the first band pass filter 26 having pass frequencies ranging from $ft_L$ to $ft_H$, where signals each having a frequency corresponding to a transmission signal are selected. The output signal of the first band pass filter 26 may have frequencies within the range of $ft_L$ to $ft_H$ and may include a plurality of pulses in which frequency components are arranged at intervals of the step frequency $\Delta f$. The individual pulses may have substantially the same magnitude, and may include comb-shaped waveforms in the frequency space. The signal illustrated in FIG. 3D may be called a comb-shaped wave.

The transmission signal including a comb-shaped wave is output to the antenna 12 through the transmitter terminal TX. A plurality of different frequency components for measurement is output based on a comb-shaped wave. A first switch SW1 is provided between the first band pass filter 26 and the transmitter terminal TX. The first switch SW1 may couple the output side of the first band pass filter 26 to the transmitter terminal TX, and may couple the output side of the first band pass filter 26 to the mixer 36 during initial phase measurement.

In the receiver circuit 30, the oscillator signal generated by the oscillator 22 is supplied to the second short pulse generator 32, as illustrated in FIG. 3A. The frequency of the oscillator signal may be Δf×n. Referring to FIG. 3E, the second short pulse generator 32 generates a plurality of pulses for reception in which a plurality of frequency components are arranged at a certain intervals, for example, at intervals of (Δf×n). Referring to FIG. 3F, the pulse signals are input to the second band pass filter 34 having pass frequencies ranging from $fr_L$ to $fr_H$, and a signal having a frequency corresponding to a local oscillator signal is selected. The frequency of the local oscillator signal may be $f_{LO}$.

A reflection signal reflected by an object is input to the mixer 36 from the receiver terminal Rx coupled to the antenna 12. A second switch SW2 may be provided between the mixer 36 and the receiver terminal Rx. The second switch SW2 may couple the receiver terminal Rx to the input side of the mixer 36, and may couple the receiver terminal Rx to a terminal 40, for example, a terminator, during initial phase measurement.

The mixer 36 down-converts the reflection signal of the transmission signal including the comb-shaped wave illustrated in FIG. 3C into a baseband signal illustrated in FIG. 3G based on the local oscillator signal which is output from the second band pass filter 34 illustrated in FIG. 3D. The baseband signal may have frequencies in a range of from $ft_L - f_{LO}$ to $ft_H - f_{LO}$, and may include a plurality of pulses in which frequency components are arranged at intervals of the step frequency Δf.

For example, the step frequency may be 100 MHz, and the pass frequencies of the first band pass filter 26 may be from 94 GHz to 95.5 GHz. The frequency of the oscillator signal illustrated in FIG. 3A may be 9.4 GHz, and the frequency dividing ratio of the frequency divider 28 may be 94. The pass frequencies of the second band pass filter 34 may be from 91.5 GHz to 96.5 GHz. The frequency of the local oscillator signal illustrated in FIG. 3F may be 94 GHz. Referring to FIG. 3G, a baseband signal including a band of from 0 GHz to 1.5 GHz and a step frequency of 100 MHz is obtained.

Referring again to FIG. 2, an analog-to-digital converter (ADC) 50, a Fourier conversion circuit 52, and a phase detecting circuit 54 of the signal processing circuit 11 are coupled to the mixer 36. The baseband signal output from the mixer 36 is converted by the ADC 50 into a digital signal, the digital signal is Fourier-converted by the Fourier conversion circuit 52, and the phase is detected by the phase detecting circuit 54. Image information may be generated based on the detected phase.

The phase detecting circuit 54 compares the phase of the reflection signal reflected by an object with the phase of the transmission signal before reflection. The first switch SW1 couples the output side of the first band pass filter 26 to the input side of the mixer 36 in order to measure the initial phase, and the second switch SW2 couples the receiver terminal Rx to the terminal 40. Since the transmission signal is input to the mixer 36, the initial phase is measured.

The transmission signal transmitted by the imaging apparatus 100 to an object may include a plurality of pulses, for example, comb-shaped waves in which frequency components are arranged in the shape of a comb in the frequency space. Since a plurality of different frequency components for measurement included in the comb-shaped wave are output, information corresponding to the plurality of frequency components may be obtained by a single measurement. The imaging apparatus 100 may not perform frequency sweeping where measurement is made while temporally changing the frequency of a transmission signal. A measurement time may be reduced compared with measurement including frequency sweeping.

The comb-shaped wave is generated by the oscillator 22 that generates the oscillator signal illustrated in, for example, FIG. 3A, the first short pulse generator 24 that generates a plurality of pulses for transmission based on the oscillator signal illustrated in, for example, FIG. 3C, and the first band pass filter 26 that generates a comb-shaped wave (D) based on a portion of the plurality of the pulses. The oscillator 22 or the first short pulse generator 24 may have another circuit configuration. The plurality of the pulses may be generated using a method other than a short pulse generator method. Since the plurality of the pulses is generated by a short pulse generator, a comb-shaped wave which is substantially uniform in a wide range may be obtained. Since a comb-shaped wave having an output magnitude independent of frequency, measurement accuracy may be enhanced.

The receiver circuit 30 of the imaging apparatus 100 includes the second short pulse generator 32 that generates a plurality of pulses (E) for reception based on the oscillator signal (A) which is used also by the transmitter circuit 20 and the second band pass filter 34 that generates a local oscillator signal (F) based on a portion of the plurality of the pulses. The second short pulse generator 32 may have another circuit configuration. The plurality of the pulses may be generated using a method other than a short pulse generator method. The plurality of the pulses may be generated by a short pulse generator.

The frequency dividing ratio n of the frequency divider 28 may be substantially a fixed number or variable number. When the frequency dividing ratio is variable, measurement accuracy may increase since the step frequency Δf is changed in accordance with an object. A maximum range $R_{max}$ within which an object may be measured is dependent on the step frequency Δf, and the maximum range $R_{max}$ may increase as the step frequency Δf decreases. The frequency of the oscillator 22 may be variable, and the frequency dividing ratio of the frequency divider 28 and the frequency of the oscillator 22 may be variable.

A frequency multiplier may be used instead of the frequency divider.

Figure 4:
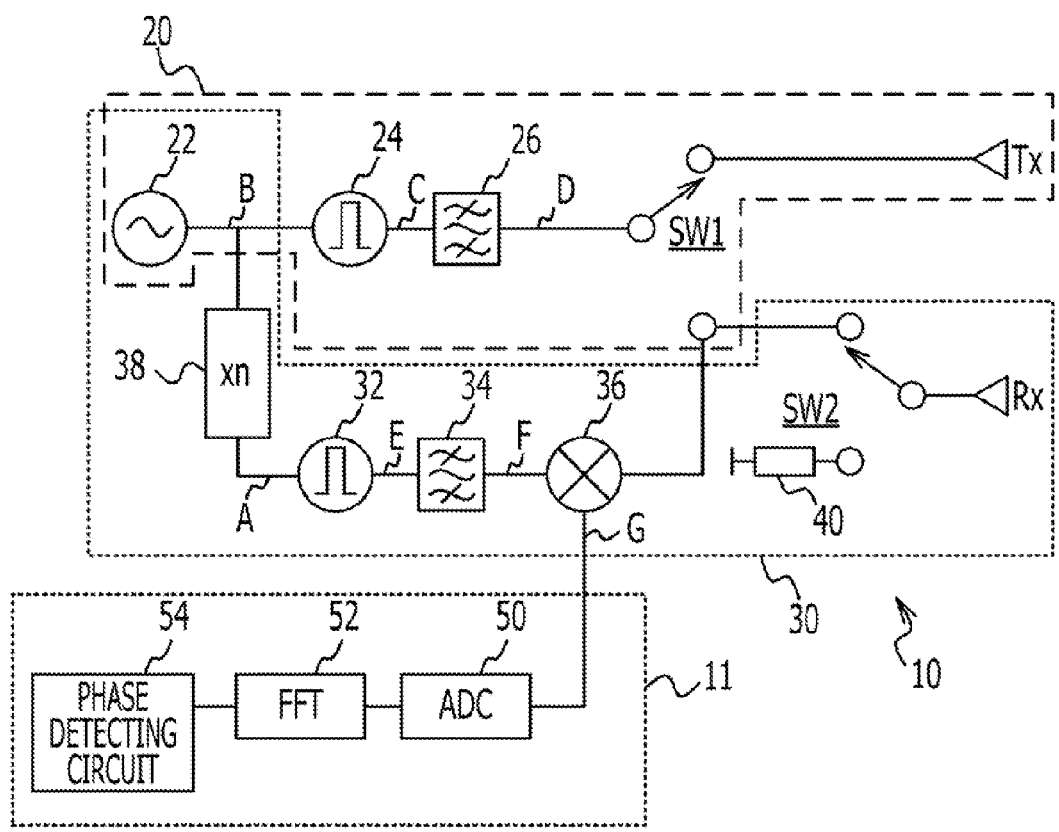
FIG. 4 illustrates an example transmission and reception apparatus.

FIG. 4 illustrates an example imaging apparatus. The imaging apparatus includes the RF circuit 10 and the signal processing circuit 11. The transmitter circuit 20 of the imaging apparatus may not include a frequency divider. The receiver circuit 30 includes a frequency multiplier 38 having a frequency multiplying ratio n. The frequency multiplier 38 may be provided between the oscillator 22 and the second short pulse generator 32. The oscillator signal generated by the oscillator 22 is input to the first short pulse generator 24 and also input to the second short pulse generator 32 through the frequency multiplier 38. In FIG. 4, the other configuration may be substantially the same as or similar to the configuration illustrated in FIG. 2, and the detailed description thereof may be omitted or reduced.

Figure 3:
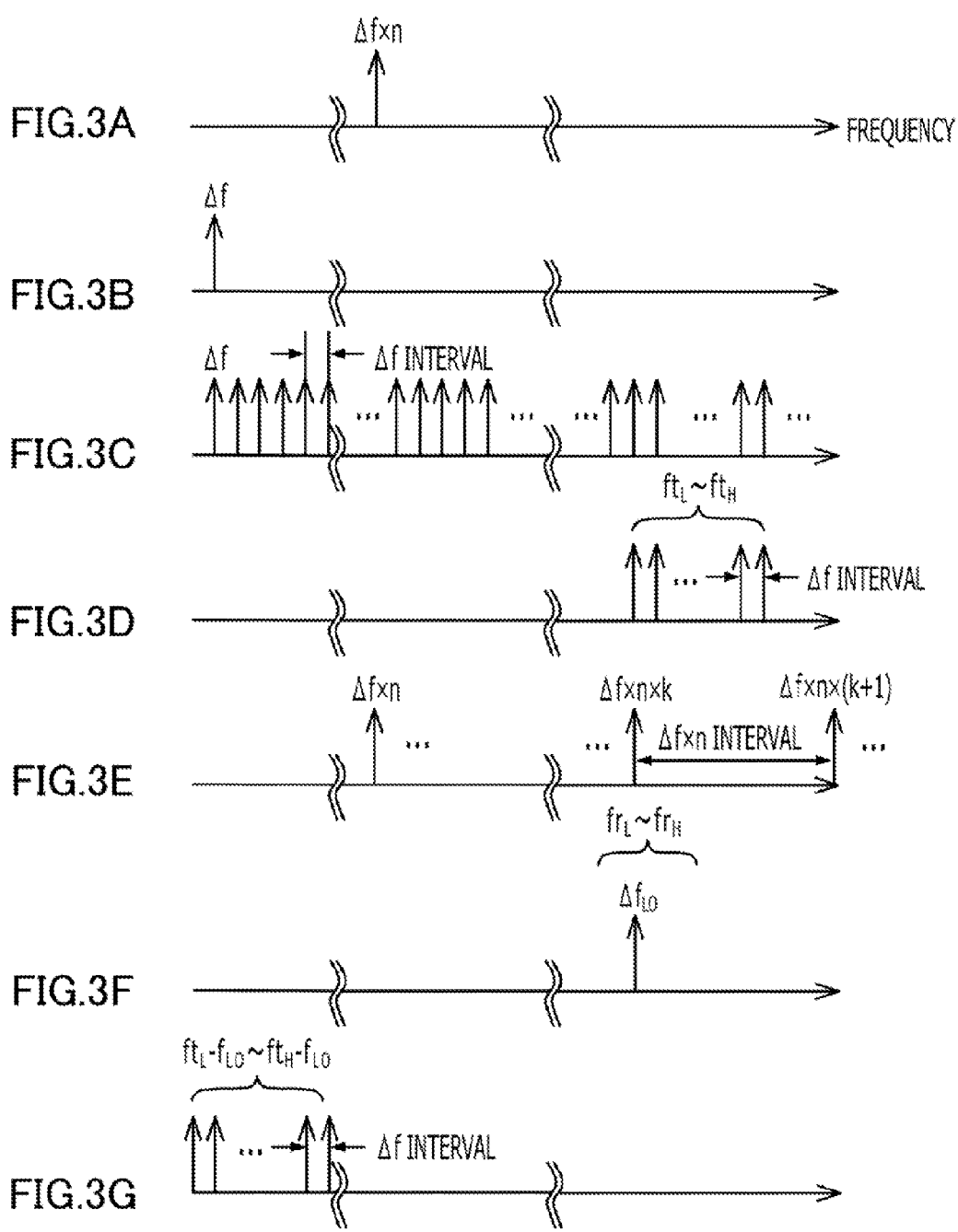
FIGS. 3A to 3G illustrate example waveforms of the transmission and reception apparatus.

The signal waveforms illustrated in FIG. 4 may be substantially the same as or similar to the signal waveforms illustrated in FIG. 3. For example, as illustrated in FIG. 3B, a low-frequency oscillator signal is first generated by the oscillator 22. For example, as illustrated in FIG. 3A, a frequency-multiplied signal to be input to the second short pulse generator 32 is generated based on the oscillator signal. The frequency of the oscillator signal may be the step frequency Δf.

For example, the step frequency Δf may be 100 MHz, and the pass frequencies of the first band pass filter 26 may be from 94 GHz to 95.5 GHz. The frequency multiplying ratio n of the frequency multiplier 38 may be 94, and the frequency of a signal fr input to the second short pulse generator 32 may be 9.4 GHz. The pass frequencies of the second band pass filter 34 may be from 91.5 GHz to 96.5 GHz. The frequency of the local oscillator signal (F) may be 94 GHz, and as illustrated in FIG. 3G, a baseband signal having a band of from 0 GHz to 1.5 GHz and a step frequency of 100 MHz is obtained.

A transmission signal including comb-shaped waves is used, and a measurement time is reduced.

The frequency $\Delta f$ of the oscillator 22 illustrated in FIG. 2 may be fixed or variable. The measurement accuracy may be enhanced by changing the step frequency $\Delta f$ in accordance with an object. The frequency multiplying ratio n of the frequency multiplier 38 may be variable, and may be controlled in accordance with the oscillation frequency $\Delta f$ so as to make the frequency $\Delta f \times n$ of a signal input to the second short pulse generator 32 substantially a constant value. The appropriate local oscillator signal $f_{LO}$ may be obtained even when the pass frequencies of the second band pass filter 34 are substantially constant.

In FIGS. 2 and 4, the transmitter circuit 20 and the receiver circuit 30 are included in a portion of the imaging apparatus 100, for example, in the RF circuit 10. The transmitter circuit 20 and the receiver circuit 30 may be a stand-alone transmission and reception apparatus.

When the pass frequencies of the first band pass filter 26 are from $ft_L$ to $ft_H$, the pass frequencies of the second band pass filter 34 may include a frequency $fr_L$ which is lower than or equal to $ft_L$ and the closest to $ft_L$, or may include $fr_H$ which is higher than or equal to $ft_H$ and the closest to $ft_H$, among the frequencies fr of the plurality of the pulses for reception illustrated in FIG. 3E. The frequencies of the baseband signal obtained by conversion performed by the mixer 36 are decreased.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A transmission and reception apparatus comprising:
    a transmitter circuit including a first signal generator to output, to an object, a first plurality of pulses being arranged at intervals of a step frequency and a first switch; and
    a receiver circuit including a second signal generator and a second switch,
    wherein the first switch couples an output of the first signal generator to a transmitter terminal in a first mode and couples the output of the first signal generator to the second signal generator in a second mode,
    the second switch couples a receiver terminal of a reflection signal reflected by the object to the second signal generator in the first mode and couples the reception terminal to a terminator in the second mode.

2. The transmission and reception apparatus according to claim 1, wherein the first signal generator includes:
    an oscillator circuit to generate an oscillator signal;
    a transmission pulse generator circuit to generate a second plurality of pulses based on the oscillator signal; and
    a first band pass filter to generate the first plurality of pulses based on at least a portion of the second plurality of the pulses.

3. The transmission and reception apparatus according to claim 1, wherein the second signal generator includes:
    an oscillator circuit to generate an oscillator signal;
    a reception pulse generator circuit to generate a third plurality of pulses based on the oscillator signal;
    a second band pass filter to generate a local oscillator signal based on at least a portion of the third plurality of the pulses, and
    a mixer to down-convert the reflection signal into a baseband signal using the local oscillator signal.

4. The transmission and reception apparatus according to claim 3, wherein pass frequencies of the second band pass filter include a frequency $fr_L$ that is lower than or equal to a frequency $ft_L$ and closest to $ft_L$ among frequencies fr of the third plurality of the pulses for reception, where pass frequencies of a first band pass filter, which generates the first plurality of pulses and is included in the first signal generator, are from $ft_L$ to $ft_H$.

5. The transmission and reception apparatus according to claim 3, wherein pass frequencies of the second band pass filter include a frequency $fr_H$ that is higher than or equal to a frequency $ft_H$ and closest to $ft_H$ among frequencies fr of the third plurality of the pulses for reception, where pass frequencies of a first band pass filter, which generates the first plurality of pulses and is included in the first signal generator, are from $ft_L$ to $ft_H$.

6. The transmission and reception apparatus according to claim 2, wherein the transmission pulse generator circuit includes a short pulse generator.

7. The transmission and reception apparatus according to claim 2,
    wherein the transmission pulse generator circuit receives a frequency-divided signal of the oscillator signal from a frequency divider provided between the oscillator circuit and the transmission pulse generator circuit.

8. The transmission and reception apparatus according to claim 7, wherein a frequency dividing ratio of the frequency divider is variable.

9. The transmission and reception apparatus according to claim 3,
    wherein the reception pulse generator circuit receives a frequency-multiplied signal of the oscillator signal from a frequency multiplier provided between the oscillator circuit and the reception pulse generator circuit.

10. The transmission and reception apparatus according to claim 9,
    wherein a frequency f of the oscillator circuit and a frequency multiplying ratio n of the frequency multiplier are variable, and
    wherein the frequency multiplying ratio n is controlled in such a manner as to make f×n be fixed, in accordance with a change in the frequency f of the oscillator circuit.

11. The transmission and reception apparatus according to claim 1, wherein the transmission signal includes any one of a microwave, a millimeter wave, a terahertz wave, and a submillimeter wave.

12. An imaging apparatus comprising:
    a transmitter circuit including a first signal generator to output, to an object, a first plurality of pulses being arranged at intervals of a step frequency and a first switch; and
    a receiver circuit including a second signal generator and a second switch; and an image information generation circuit to generate image information based on the reflection signal, wherein the first switch couples an output of the first signal generator to a transmitter terminal in a first mode and couples the output of the first signal generator to the second signal generator in a second mode, the second switch couples a receiver terminal of a reflection signal reflected by the object to the second signal generator in the first mode and couples the reception terminal to a terminator in the second mode.

13. A transmission and reception apparatus comprising:
an oscillator circuit to generate an oscillator signal;
a transmitter circuit including a first signal generator to output, to an object, a first plurality of pulses being arranged at intervals of a step frequency based on the oscillator signal and a first switch; and
a receiver circuit including a second signal generator and a second switch,
wherein the first switch and the second switch make loop between the transmitter circuit and the receiver circuit in an initial phase measurement.

14. The transmission and reception apparatus according to claim 1, wherein each of the first plurality of pulses has substantially the same magnitude so as to make the first plurality of pulses a comb-shape in a frequency space.

15. The imaging apparatus according to claim 12, wherein each of the first plurality of pulses has substantially the same magnitude so as to make the first plurality of pulses a comb-shape in a frequency space.

16. The transmission and reception apparatus according to claim 13, wherein the receiver circuit includes a mixer coupled to the first signal generator and the second signal generator in the loop.

17. The transmission and reception apparatus according to claim 1, wherein the first mode is a normal operation mode and the second mode is an initial phase measurement mode.

18. The transmission and reception apparatus according to claim 1, wherein the step frequency is changed based on the object.

19. The imaging apparatus according to claim 12, wherein the first mode is a normal operation mode and the second mode is an initial phase measurement mode.

20. The imaging apparatus according to claim 12, wherein the step frequency is changed based on the object.

* * * * *